United States Patent [19]

Green

[11] 4,345,194

[45] Aug. 17, 1982

[54] CONTROL SYSTEM TO REDUCE THE EFFECTS OF FRICTION IN DRIVE TRAINS OF CONTINUOUS-PATH-POSITIONING SYSTEMS

[75] Inventor: Walter L. Green, Concord, Tenn.

[73] Assignee: The United States of America as represented by the United States Department of Energy, Washington, D.C.

[21] Appl. No.: 212,045

[22] Filed: Dec. 1, 1980

[51] Int. Cl.³ .......................................... G05D 23/275
[52] U.S. Cl. .................................... 318/621; 318/618; 318/632
[58] Field of Search ................. 318/621, 622, 632, 618

[56] References Cited

U.S. PATENT DOCUMENTS

| 3,012,180 | 12/1961 | Finvold | 318/621 X |
| 3,777,243 | 12/1973 | Taguchi et al. | 318/621 |
| 3,790,764 | 2/1974 | Rouxel | 318/621 X |
| 3,793,576 | 2/1974 | Masuzawa et al. | 318/621 |

Primary Examiner—B. Dobeck
Attorney, Agent, or Firm—David E. Breeden; Stephen D. Hamel; Richard G. Besha

[57] ABSTRACT

An improved continuous-path-positioning servo-control system is provided for reducing the effects of friction arising at very low cutting speeds in the drive trains of numerically controlled cutting machines, and the like. The improvement comprises a feed forward network for altering the gain of the servo-control loop at low positioning velocities to prevent stick-slip movement of the cutting tool holder being positioned by the control system. The feed forward network shunts conventional lag-compensators in the control loop, or loops, so that the error signal used for positioning varies linearly when the value is small, but being limited for larger values. Thus, at higher positioning speeds there is little effect of the added component upon the control being achieved.

4 Claims, 6 Drawing Figures

CONTROL SYSTEM TO REDUCE THE EFFECTS OF FRICTION IN DRIVE TRAINS OF CONTINUOUS-PATH-POSITIONING SYSTEMS

BACKGROUND OF THE INVENTION

The subject invention relates generally to positioning systems and more particularly to improvements in a servo-control continuous path closed-loop position control of an object.

In the art of precision positioning systems to position a machine tool slide, for example, it has generally been the practice to utilize a rotary prime mover coupled to a ball nut/lead screw. Linear slide motion is obtained by attaching the ball nut to the machine slide while driving the lead screw through a gear box. The prime mover may take various rotary drive forms, such as servo motors, pulse motors or pneumatic drives. A numerical controller may be employed to generate position command signals for multiple axis coordinated continuous position control of a machine tool from part description data stored on punched tape or other storage media. Continuous-path-positioning as opposed to point-to-point positioning requires extremely precise control of the velocity on the object being positioned at all times.

Various advances in the art have been used to improve the tool-positioning accuracy in the above-described machining system. For example, the laser interferometer has been employed to monitor the slide movement and its output compared with the command signals to obtain a following error signal which is used to power the prime mover through a servo amplifier. A velocity feedback arrangement has been combined with the laser interferometer position feedback to improve position accuracy. Normally a rotary transducer, such as a tachometer generator, is attached to the lead screw to generate the velocity control feedback signal. Nevertheless, prior art continuous-path-position control systems were limited with respect to their prospective utility in many applications, especially diamond machining of mirror surface finishes of complex geometric configurations. For continuous-path-precision machining systems, the above-described systems cannot be controlled to obtain continuous-path following errors in the range required for precise surface finishes.

For a specific feed rate, the error signal will have two significant components: a steady state following error level and a transient error level riding the following error level. The small steady state error is required to reduce the effects of load disturbances while a small transient error is required for a good surface texture.

Large loop gains are generally necessary for the position and velocity loops in order to reduce the error signal. A conventional way for achieving this is to use a lag compensator in the forward path. In some cases, this signal compensator is not adequate, particularly in ultra-precision machining. A second lag compensator added to the outer loop may be used to further reduce the error signal. This arrangement, either the single inner loop lag compensator or the combination of inner and outer loop lag compensation, is effective for routine cutting speeds (i.e., 0.05 inch per minute and higher).

At low cutting speeds, however, even very low friction in the drive train will cause a sticking and then slipping effect. It is believed that the slow transient response of the lag compensator allows the error signal to reach several microinches before a large enough portion of the signal has reached the terminals of the motor to effect the change in position, thus causing the stick-slip movement of a tool holder on the axis slide, or the like. The result is a finish on the machined part that is inferior to that obtained at higher cutting speeds. However, slow cutting speeds cannot be avoided when preparing certain parts.

Therefore, there is a need for improvements in continuous-path-position control systems for precision, continuous-path contour machining which can be operated at very low velocities and yet obtain an acceptable surface finish by maintaining transient positioning errors for the individual machine slides to less than 3 microinches.

SUMMARY OF THE INVENTION

In view of the above need it is a primary object of this invention to provide an improved position-control system for precision continuous-path-position control of an object at low velocities.

Another object of this invention is to provide a continuous-path-control system as in the above object which eliminates stick-slip movement of the object being positioned by the system at low velocities.

Further, it is an object of this invention to provide a control system as in the above objects wherein ultra-precision machining of surfaces may be maintained over a relatively wide range of cutting speeds.

Additional objects, advantages, and novel features of the invention will be set forth in part in the description which follows and in part will become apparent to those skilled in the art upon examination of the following or may be learned by practice of the invention. The objects and advantages of the invention may be realized and attained by means of the instrumentalities and combinations as particularly pointed out in the appended claims. To achieve the foregoing and other objects and in accordance with the purpose of the present invention as embodied and broadly described herein, a feed forward circuit has been provided by which, when connected in parallel with lag compensation networks in a continuous-path-positioning servo system, the control loop gain may be altered by increasing the gain at low positioning velocities to prevent stick-slip movement of the object being positioned. The feed forward network may further include an output limiter to prevent further increase in the feed forward signal at velocities above a preselected value to maintain stable operation of a continuous-path control system over a relatively wide range of positioning velocities.

BRIEF DESCRIPTION OF THE DRAWINGS

The accompanying drawings which are incorporated in and form a part of the specification, illustrate the present invention, and together with the description, serve to explain the principles of the invention.

In the drawings.

DETAILED DESCRIPTION OF THE INVENTION

Figure 4:
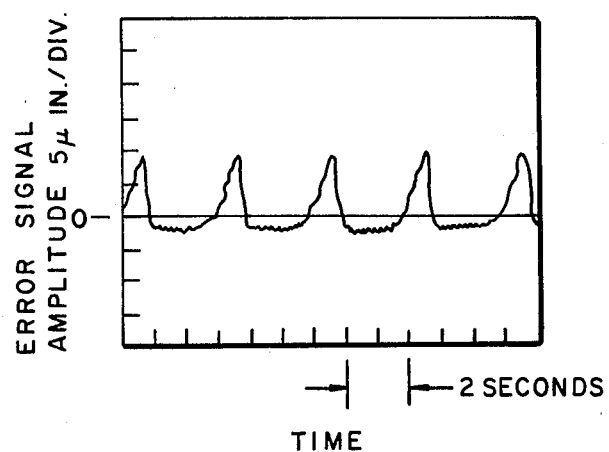
FIG. 4 is a plot illustrating the irregular error signal experienced using a conventional control circuit when a very low (0.00025 inch/min) cutting speed is used.

Considerable development has been directed toward the elimination of friction in drive units used in the ultra-precision machining of parts. These include lead-screw drives utilizing low friction components as well as oil- or air-supported slide bearings, etc. Even with these developments, however, there is a finite amount of friction. At cutting rates of 0.05 inch/min, or higher, this friction is not sufficient to create a problem in the feedback circuits which regulate the position of the cutting tool. However, as pointed out above, at very low cutting speeds components in the drive train tend to first stick and then slip, giving rise to a very irregular error signal as shown in FIG. 4 and thereby resulting in a less than desired finish on a machined part.

Figure 1:
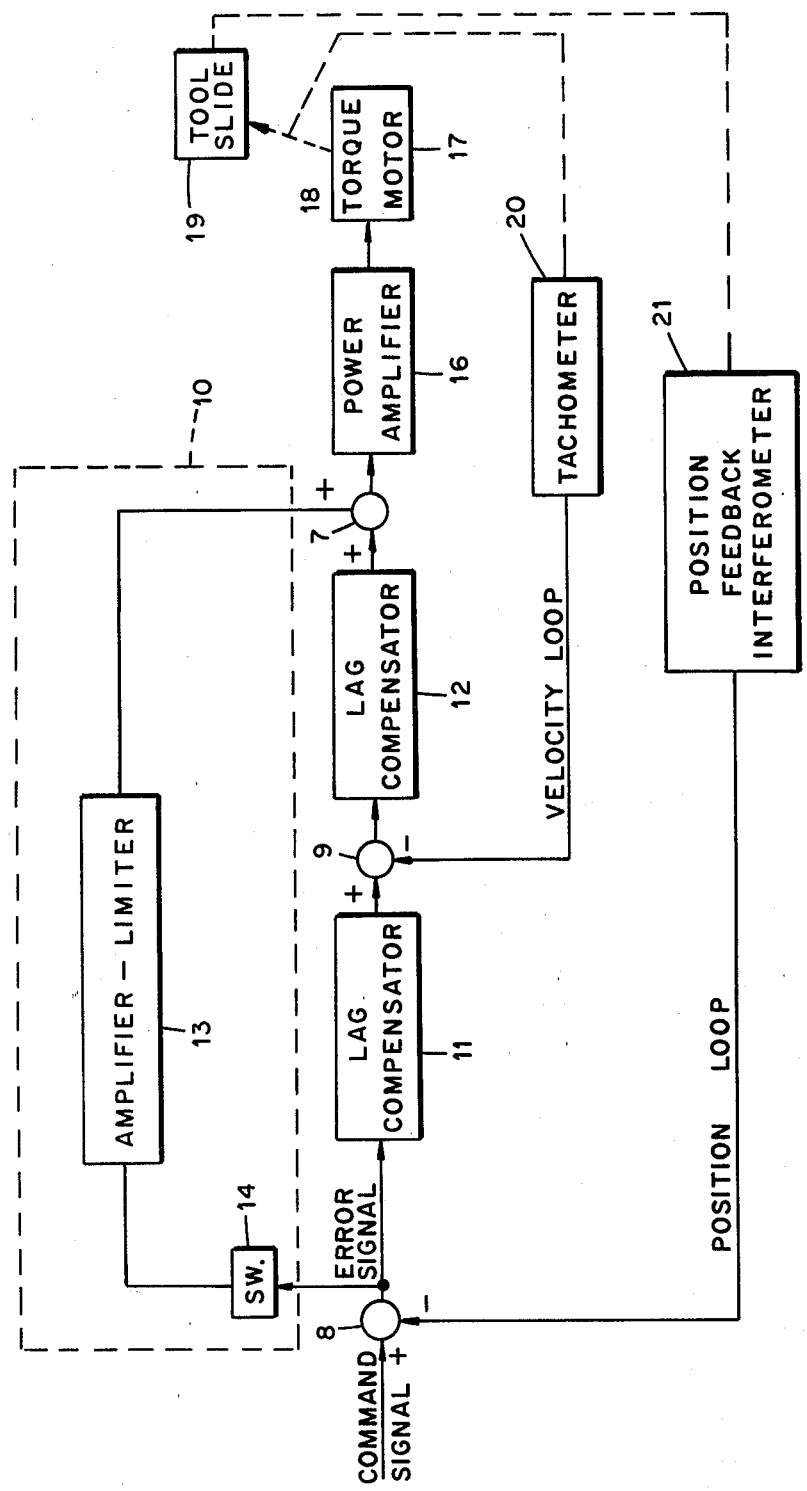
FIG. 1 is a schematic block diagram of a position-control system used with numerically controlled machining equipment employing the improvements according to the present invention.
Figure 3:
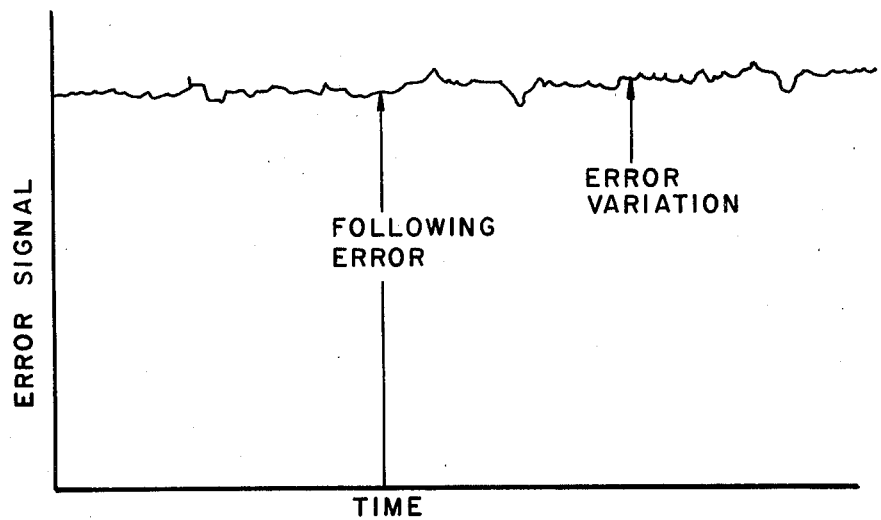
FIG. 3 is a plot illustrating the typical error signal experienced using a conventional control circuit. This figure illustrates the typical steady state error together with the common transient error.

Referring now to FIG. 1, the invention will be illustrated by means of a detailed description of a control system for a single axis slide of a machining system, for example, in order to fully illustrate the invention in the least complicated form. It will be understood by those skilled in the art that a multiple axis machine employing servo drive motors and air-bearing slides or other types of drive mechanisms may be controlled by duplicating the circuit arrangement described herein for each axis, as for example in a precision continuous-path contour-machining system.

In the conventional arrangement, a tool slide 19 is mounted to be moved by a motor such as a torque motor 17 connected to a lead-screw drive 18 along the axis of the slide 19. Command signals from a numerical controller, or the like, are supplied to a summing circuit 8 wherein the command signal is compared with the negative feedback position signal from a position-feedback network, such as the interferometer system 21, which monitors the movement of the tool slide 19. The error signal produced at this point is normally supplied to the input of a position lag compensator circuit 11 whose output is connected to the input of a second summing circuit 9 in which it is compared with a negative feedback velocity signal generated in a velocity feedback loop. The velocity signal may be generated by a tachometer 20 which is connected to the lead screw 18 rotated by the torque motor 17. The output of the summing circuit 9 is applied to the input of a second lag compensator 12. In the conventional control scheme using both position and velocity feedback, the output of the lag compensator 12 is connected directly to the input of a power amplifier 16 whose output provides a signal having prescribed gain to drive the torque motor 17.

In accordance with the present invention, a feed forward circuit 10 is provided which at low velocities feeds the error signal at the output of the summing circuit 8 to one input of an additional summing circuit 7 connected between the output of the lag compensator 12 and the power amplifier 16. The feed forward network 10 comprises an amplifier-limiter network 13 with specific gains adjusted for a particular machine tool drive train.

Figure 2:
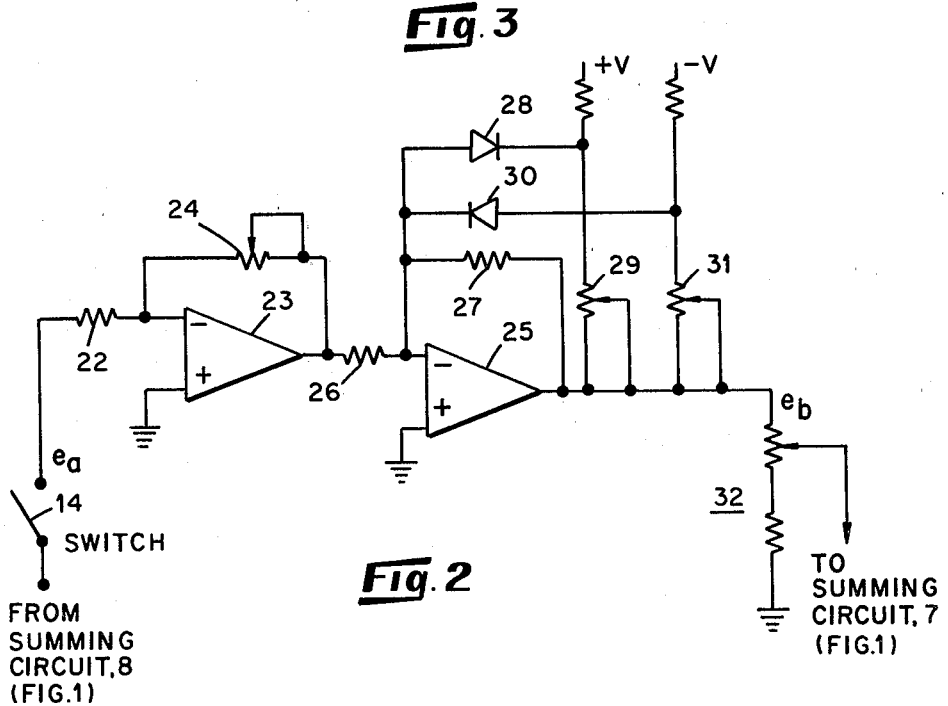
FIG. 2 is a detailed schematic diagram of the amplifier-limiter network of FIG. 1.

Referring now to FIG. 2, the feedback network will be described in detail. The output of the summing circuit 8 is connected through the switch 14 and a resistor 22 to the inverting input of an operational amplifier 23. The non-inverting input of amplifier 23 is connected to ground potential. A variable resistor 24 is connected between the inverting input and the output of amplifier 23. The output of amplifier 23 is further connected to the inverting input of another operational amplifier 25 through a resistor 26. The non-inverting input of amplifier 25 is connected to ground potential. A feedback resistor 27 is connected between the output of amplifier 27 and the inverting input thereof.

Both the negative and positive voltage outputs of amplifier 25 are limited to provide stable operation of the position control system. The positive output limit is provided by means of diode 28 and a variable resistor 29 connected between the input and output of amplifier 25. An appropriate positive bias voltage ($+v$) is applied to the junction of the diode 28, cathode lead and the resistor 29. Similarly, the negative output level is limited by connecting a diode 30 and a variable resistor 31 between the input and the output of amplifier 25 with an appropriate negative bias voltage applied to the diode 30 anode lead and resistor 31 junction. The output of amplifier 25 ($e_b$) is connected through a variable resistor network 32 to the summing circuit 7, as shown in FIG. 1.

Figure 6:
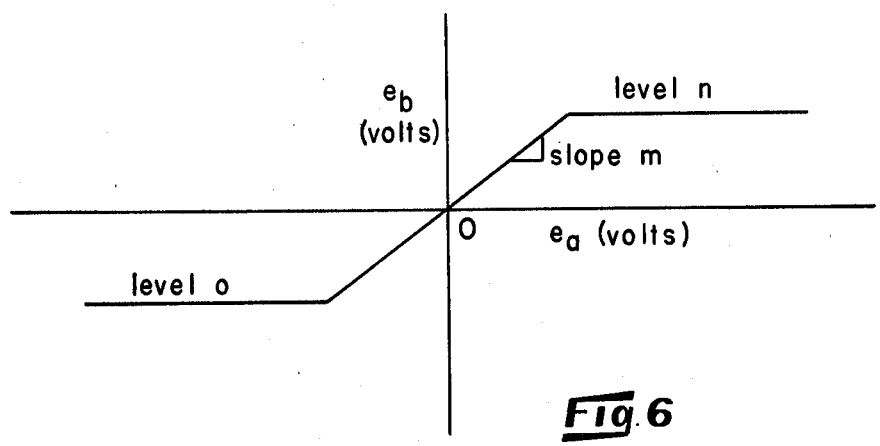
FIG. 6 is a graphic illustration of a typical electrical response of the feed forward circuit of FIG. 2.

In this arrangement, an error signal entering the feed forward network, denoted by $e_a$, and leaving the output of amplifier 25, denoted by $e_b$, is modified as shown in FIG. 6.

The slope m of the characteristic shown in FIG. 6 is adjusted by changing resistor 24. An increase in resistance increases the slope and a decrease in resistance decreases the slope. Increasing the resistance corresponds to increasing the gain of operational amplifier 23 while decreasing the resistance decreases the gain.

Resistors 29 and 31 are used to change the limit levels n and o, respectively. Resistor 29 sets level n while resistor 31 sets level o. The two levels can be adjusted independently but usually they are adjusted so that their magnitudes are equal. Resistor 32 is used to adjust the overall signal level applied to the power amplifier.

The purpose of adjusting the slope of the amplifier limiter characteristic is to change the gain of the signal, $e_a$, that passes through the feed forward circuit. The gain required depends on the amount of stick-slip present which varies from one system to another.

Levels n and o may be changed in order to set the maximum value of the feed forward signal that can be applied to the power amplifier. As the velocity command increases, the signal value $e_a$ in FIG. 2 increases as does also the signal $e_b$. A maximum limit must be set on $e_b$ to prevent instability of the overall machine tool system. This maximum level changes from machine to machine and hence a means for adjusting this level is required.

The properties and construction of limiter circuits are well known in the art and several similar circuits may be used to provide the required bipolar limiting function discussed above relative to the specific embodiment shown and described.

At low velocities the feed forward network creates a linear steady state output error signal from the feed forward circuit 10 which is combined with the output of the lag compensator 12 at summing network 7. This increases the error signal applied to the power amplifier 16 linearly with response to the position error to immediately force an increase in the system gain to overcome the stick-slip movement of the slide 19.

Voltage limiting is used to prevent the feed forward signal from exceeding an excessive voltage level, typically ±0.5 volts in the manner described above. This limiting is necessary since the steady state error signal increases as the cutting speed increases. If it is not limited, the signal becomes large enough to cause the system to become unstable at increased velocities. Thus, when the bypass signal reaches the voltage limit, there is no further error signal modification and the lag compensators 11 and 12 resume their normal function in controlling the positioning operation. This conventional control combined with the feed forward network 10, which provides high-position loop gain at very low velocities, reduces the following error for accurate continuous-path-position control and yet provides a stable operating system over a broad range of cutting speeds.

In applications where only relatively high cutting speeds, or positioning velocities in the case of a purely positioning system, the bypass circuit 10 may be removed from the control system by means of opening a switch 14 provided in the input line to the circuit 10.

Figure 5:
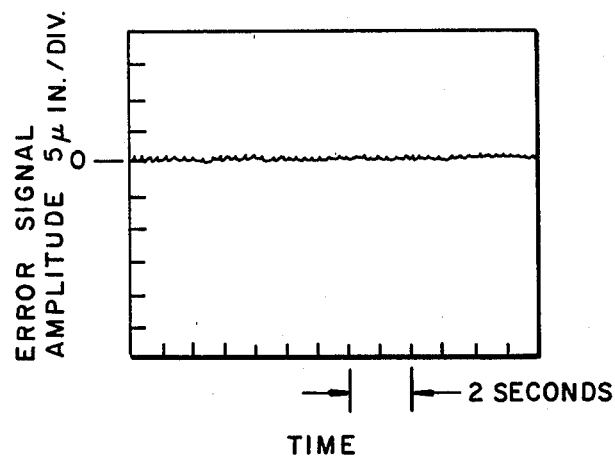
FIG. 5 is a plot of the error signal achieved when a conventional positioning servo system is modified as shown in FIG. 1.

In tests of a machining system employing the feed forward circuit improvement as shown in FIGS. 1 and 2, a cutting speed of 0.00025 inch/min along the single axis was used. When the feed forward circuit was not in use, an error signal exhibiting stick slip as shown in FIG. 4 was observed. However, with the feed forward circuit connected, essentially no variation occurred in the error signal due to stick-slip movement of the tool slide. This improved performance is illustrated in FIG. 5. This type of error signal was correlatable to a much finer finish on a machined part than that which resulted without the employment of the feed forward circuit. The improved continuous-path-positioning system allows the cutting speed to span from 0 to 0.1 inch/min with a variation in the error signal of less than 3 microinches. These tests were preformed on a lead-screw-drive turning machine.

The foregoing description of a preferred embodiment of the invention has been presented for the purpose of illustration of the invention and not intended to be exhaustive or to limit the invention to the precise form disclosed. It was chosen and described in order to best explain the principles of the invention and their practical application to thereby enable others skilled in the art to best utilize the invention and various embodiments as are suited to the particular use contemplated. It is intended that the scope of the invention be defined by the claims appended hereto.

What is claimed is:

1. In a continuous-path-positioning servo system wherein a position error signal is generated and fed to a drive means by comparing a command position signal with a feedback position signal indicative of the actual position of an object positioned by said drive means in a position control loop including a position lag compensation network series connected within said position control loop and a velocity feedback control loop operatively connected within said position control loop including a velocity lag compensation network series connected with said velocity control loop and said position control loop, the improvement comprising: a feed forward circuit means connected in parallel with both said position and said velocity lag compensation networks for increasing the control loop gain at low error signal levels to prevent stick-slip movement of said object being positioned.

2. The combination as set forth in claim 1 wherein said feed forward circuit means includes at least one series connected linear amplifier having a predetermined gain for amplifying said position error signal applied to said drive means to a level sufficient to overcome said stick-slip movement of said object at low velocities.

3. The combination as set forth in claim 2 wherein said feed forward circuit means further includes a voltage limiter connected in series with the output of said at least one linear amplifier to limit the feed forward error signal gain of said feed forward circuit means to prevent unstable operation of said positioning system at velocities of said object above about 0.1 inch per minute.

4. The combination as set forth in claim 3 wherein said voltage limiter is a bipolar voltage limiter and the positive and negative output voltages of said limiter are limited to values corresponding to velocities less than 0.1 inch per minute of said object being positioned.

* * * * *